United States Patent
Bielby

(10) Patent No.: US 11,884,235 B2
(45) Date of Patent: Jan. 30, 2024

(54) MOBILE CONTROL OF A VEHICLE

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

(*) Notice: Subject to any disclaimer, the term of this patent is extended or adjusted under 35 U.S.C. 154(b) by 635 days.

(21) Appl. No.: 16/848,621

(22) Filed: Apr. 14, 2020

(65) Prior Publication Data
US 2021/0316700 A1 Oct. 14, 2021

(51) Int. Cl.
B60R 25/24 (2013.01)
B60R 25/30 (2013.01)
B60R 25/01 (2013.01)

(52) U.S. Cl.
CPC ............ B60R 25/241 (2013.01); B60R 25/01 (2013.01); B60R 25/305 (2013.01)

(58) Field of Classification Search
CPC ...... B60R 25/241; B60R 25/01; B60R 25/305
See application file for complete search history.

(56) References Cited

U.S. PATENT DOCUMENTS

| | | | |
|---|---|---|---|
| 2011/0217929 A1* | 9/2011 | Anderson | H04M 1/6091 455/41.2 |
| 2014/0012475 A1* | 1/2014 | Pallett | B60T 7/06 701/70 |
| 2014/0163774 A1* | 6/2014 | Demeniuk | H04W 4/70 701/2 |
| 2015/0210287 A1* | 7/2015 | Penilla | B60W 40/08 701/49 |
| 2016/0071395 A1* | 3/2016 | Demeniuk | H04W 76/14 340/686.1 |
| 2018/0288232 A1* | 10/2018 | Macneille | H04M 11/007 |
| 2019/0265868 A1* | 8/2019 | Penilla | H04L 63/083 |
| 2019/0283529 A1* | 9/2019 | Macneille | B60H 1/00771 |
| 2019/0291719 A1 | 9/2019 | Tiziani | |

OTHER PUBLICATIONS

International Search Report and Written Opinion, PCT/US2021/0269741, dated Aug. 2, 2021.

* cited by examiner

*Primary Examiner* — Thomas D Alunkal
(74) *Attorney, Agent, or Firm* — Greenberg Traurig

(57) ABSTRACT

When a mobile device is securely connected to a vehicle, at least a portion of a control interface of the vehicle can be extended to the mobile device, allowing a user of the mobile device to operate certain functions of the vehicle from the mobile device. For example, a passenger of a vehicle can control some aspects of the vehicle, while the driver controls driving aspects. Optionally, the passenger can take the role of a co-driver or co-pilot of the vehicle in some embodiments.

14 Claims, 6 Drawing Sheets

MOBILE CONTROL OF A VEHICLE

FIELD OF THE TECHNOLOGY

At least some embodiments disclosed herein relate to control of vehicles and vehicle systems via mobile devices.

BACKGROUND

In the 1990s, consumer cars started to hit the market with bi-directional connectivity to positioning and communications networks for roadside assistance, navigation, and other services. In at least the last ten years, connected cars have become very prevalent. Bi-directional connectivity in other types of vehicles has also become pervasive, and many types of vehicles were connected to such networks prior to cars, such as various types of military vehicles. For example, the GPS project was started by the U.S. Department of Defense in 1973, with the first prototype spacecraft launched in 1978. Originally, GPS was limited to military vehicles, but by the 1980s it became allowed for civilian use.

A connected car or vehicle is a vehicle that can communicate bidirectionally with other systems outside of the vehicle such as via a LAN and/or WAN. This allows the vehicle to share communications systems access, such as Internet access; thus, data can be shared with devices inside and outside the vehicle. There are several ways a vehicle can be connected. For example, vehicles can be connected via networks to infrastructure, other vehicles, and Internet of Things (IoT) devices such as mobile devices.

Technological innovation in the field of connectivity is accelerating, and high-speed computing as well as big data is advancing the control and connectivity of vehicles through computing. Every year, self-driving vehicles is becoming more and more a future reality. Also, the Internet of Things is becoming more prevalently used to provide mobile services in the car with Internet. Currently, roadside assistance, navigation, and infotainment services via car connectivity are prevalent.

Although connected cars and vehicles offer a lot of benefits, there are technical problems to consider. A significant issue holding back various levels of vehicle connectivity is hackability of vehicle systems. The more a vehicle is connected to the Internet or another type of bi-directional communications system, the more it becomes exposed to being breached from the outside by malicious actors. Reliability is also a significant concern. Vehicle electronics and sensors as well as network hardware can malfunction, and the risk of malfunction grows with the increase in dependency on such devices. Electronic systems also need to overcome difficulties presented by incorrect data and faulty communications channels.

Vehicles can include cars, trucks, boats, and airplanes, as well as vehicles or vehicular equipment for military, construction, farming, or recreational use. Vehicles can be customized or personalize via vehicle electronics. Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery. Related elements for control of electrical vehicular systems are also found in hybrid and electric vehicles such as hybrid or electric automobiles. For example, electric cars can rely on power electronics for main propulsion motor control and managing the battery system.

In general, vehicle electronics can be distributed systems and can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy in to six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
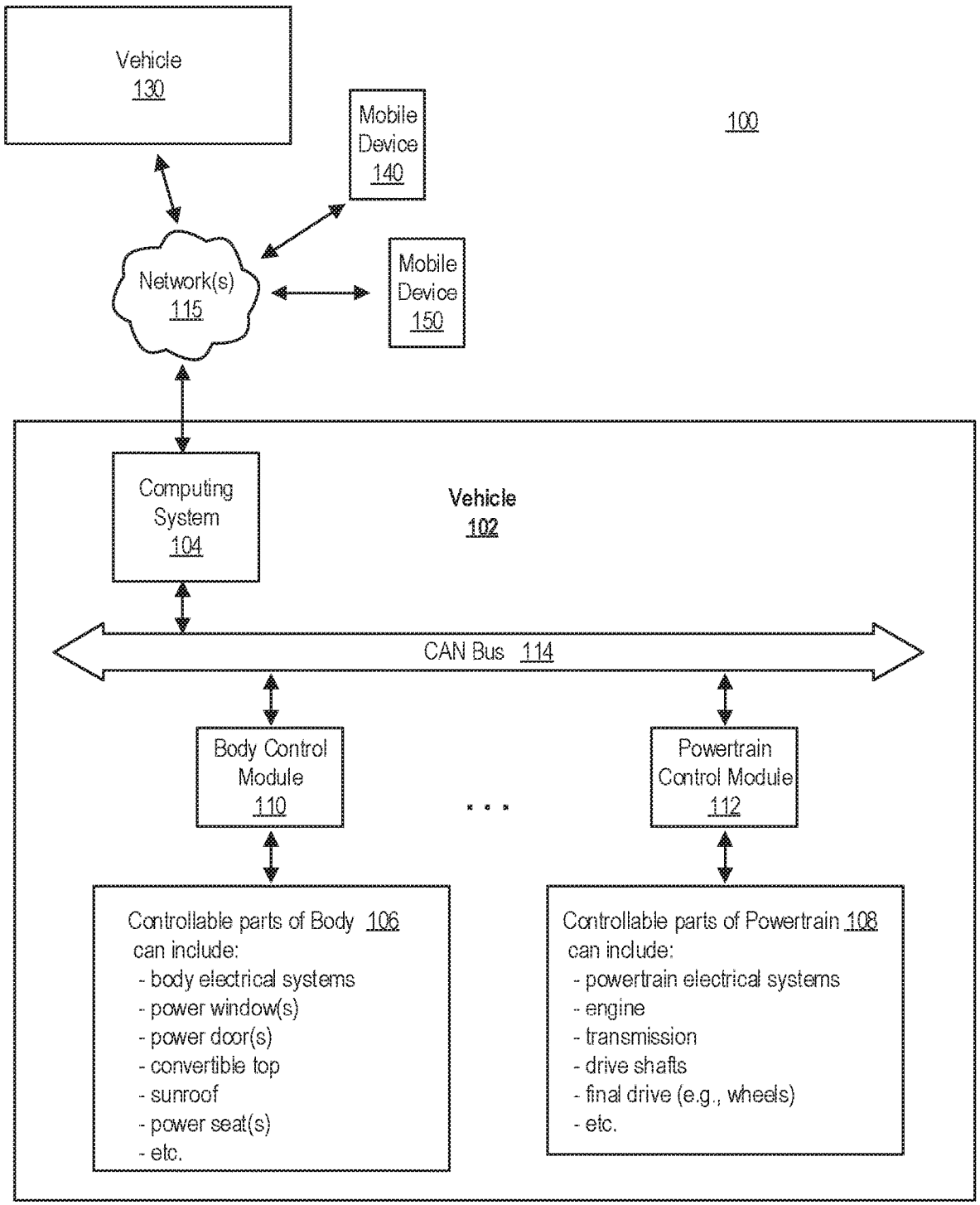
FIGS. 1 to 3 illustrate an example networked system that includes at least mobile devices and vehicles and that is configured to implement mobile control of vehicles, in accordance with some embodiments of the present disclosure.

At least some embodiments disclosed herein relate to control of vehicles and vehicle systems via mobile devices. When a mobile device is securely connected to a vehicle, a portion of a control interface of the vehicle can be extended to the mobile device, allowing a user of the mobile device to operate certain functions of the vehicle from the mobile device. For example, a passenger of a vehicle can control some aspects of the vehicle, while the driver controls driving aspects. Optionally, the passenger can take the role of a co-driver or co-pilot of the vehicle in some embodiments.

Since mobile devices can be given control of vehicle systems, computing and communications security are important considerations in embodiments. In some embodiments, the mobile control of the vehicle or vehicle system is given after an authentication process (such as a multi-factor authentication process). Also, in some embodiments, the communications between the mobile device and the vehicle to control the vehicle are secured with cryptographic mechanisms.

A passenger of the vehicle can control some aspects of the vehicle via a mobile device. In some embodiments, the passenger can control passenger and/or driver comfort aspects (e.g., seat position and/or seat shape adjustments, air temperature and other air conditions, seat temperature), non-driving features (e.g., heating and conditioning of windows, mirrors, and wipers, window positioning, as well as door, glove compartment, and trunk locking and unlocking, and lighting), entertainment or infotainment systems, navigation systems, telephone systems, and other electronic integrated cockpit systems that do not control driving of the vehicle.

Also, a driver of a vehicle can control some aspects of the vehicle, including driving aspects. The driver can control some or all the things the passenger can control depending on the implementation.

And, in some embodiments, the passenger can control some driving aspects (or take the role of a co-pilot or co-driver). For example, a driving educator or trainer or a parent of a driver can become a co-driver with a student driver.

The driving aspects controlled by the mobile phone can include driving configurations and preferences adjustable from the controller via automotive electronics (such as adjustments in the transmission, engine, chassis, passenger environment, and safety features via respective automotive electronics).

A user, via the mobile device, can also control automated driving configurations and preferences. A user, via the mobile device, can also control various levels of automation according to the SAE. The user, via the mobile device, can control no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). The user, via the mobile device, can also control driving mode such as sports or performance mode, fuel economy mode, tow mode, all-electric mode, hybrid mode, AWD mode, FWD mode, RWD mode, and 4WD mode.

The user, via the mobile device, can also control specific transmission configurations, engine configurations, and chassis configurations, in some embodiments. The user, via the mobile device, can also control adjustment of parts of the vehicle via respective electronics for the parts.

The mobile control, in some embodiments, occurs via a security protocol that can have various mechanisms for evaluating the legitimacy of the communications over the link between the vehicle's systems and the mobile device. And, the aforesaid fields and the data within the fields can be factors and input for algorithms for determining the legitimacy of the communications. There can be patterns in the communications that are learned over time that are usually normal, and other patterns that can be learned to be abnormal and suspicious, within the protocol. And, machine learning and AI can be used at least partially for the evaluations of legitimacy of the communications sent via the protocol.

The security protocol can also include cryptography mechanisms (e.g., asymmetric cryptography) as well as authentication mechanisms (e.g., single-factor authentication, multi-factor authentication, two-factor authentication, etc.) for securing the communications. The authentication factors can be knowledge factors (e.g., pins and passwords), possession factors (e.g., tokens), inherent factors (e.g., fingerprints, voice, and behavioral dynamics), and location factors (e.g., proximity to entrance of vehicle, driver seat, or passenger seat).

An example method of control of a vehicle by a mobile device can include opening of a user interface (UI) for vehicle control on a mobile device. The UI can provide a routine for user authentication and/or safety checks. The UI, using an application for vehicle or vehicle system control, can negotiate one or more connections with electronics and one or more computing systems of a vehicle based on the authentication and/or safety checks. Once a connection is made, a user of the mobile device is capable controlling aspects of the vehicle; however, control can be dependent on conditions of one or more situations when the control app is activated (e.g., status of user being a passenger or a driver, status of vehicle moving and type of movement, parking situation, etc.). The control application can send instructions to systems of vehicle, and then the systems of the vehicle can receive instructions from the mobile device and act accordingly. The systems of the vehicle can have additional failsafe or safety checks or validity checks (e.g., two or multiple layers of security and safety checks after authentication, one conditional check at mobile device, and one at systems or aspects to be controlled in vehicle). Also, the vehicle systems can provide feedback to improve the UI (e.g., feedback can be a basis for favorites list in control UI).

An example vehicle in some embodiments can include a body, a powertrain, a chassis, vehicle electronics, and a computing system. In some embodiments, the powertrain of a vehicle can be attached to a body and/or the chassis of the vehicle. The powertrain of the vehicle can include an engine, and suspension and steering systems. The vehicle electronics of such a vehicle can include electronics for the body, the powertrain, or any other part of the vehicle, or any combination thereof.

In such embodiments and others, the computing system can be configured to receive a request from a first user of a first mobile device in the vehicle to control at least one electronic device (an "electronic device" is sometimes referred to herein as simply an "electronic") of the vehicle electronics. It can also be configured to receive a credential from the first mobile device as well as to verify the accuracy of the credential and verify that the first user has permission to control the at least one electronic of the vehicle electronics. And, it can be configured to extend control of the at least one electronic of the vehicle electronics to the first mobile device in response to successful verifications that the credential is valid and the first user has permission to control the at least one electronic. It can also be configured to determine whether the first user has priority over a second user of a second mobile device for control of the at least one electronic of the vehicle electronics, when the second user is controlling the at least one electronic. And, it can be configured to transfer control of the at least one electronic of the vehicle electronics from the second mobile device to the first mobile device in response to determining the first user has priority over the second user for the control of the at least one electronic and in response to successful verifications that the credential is valid and the first user has permission to control the at least one electronic.

In such embodiments and others, the computing system can also be configured to add shared control of the at least one electronic of the vehicle electronics for the first mobile device in which the first and second mobile devices share control of the at least one electronic, in response to determining the first user has equal priority with the second user for the control of the at least one electronic and in response to successful verifications that the credential is valid and the first user has permission to control the at least one electronic.

An example mobile device in some embodiments can include a user interface and a computing system configured to send a request, inputted via the user interface, from a user of the mobile device to a vehicle to control at least one electronic of vehicle electronics of the vehicle while the user is in the vehicle. The computing system of the mobile device can also be configured to authenticate, via the user interface, the user. It can also be configured to verify that the user has permission to control the at least one electronic. It can also be configured to determine whether the user has priority over a second user of a second mobile device for control of the at least one electronic, when the second user is controlling the at least one electronic. And, it can also be configured to transfer control of the at least one electronic from the second mobile device to the mobile device in response to determining the user has priority over the second user for the control of the at least one electronic and in response to successful verifications that the authentication is valid and the first user has permission to control the at least one electronic.

In such embodiments and others, the computing system of the mobile device can also be configured to add shared control of the at least one electronic of the vehicle electronics for the mobile device in which the mobile device and the second mobile devices share control of the at least one electronic, in response to determining the user has equal priority with the second user for the control of the at least one electronic and in response to successful verifications that the authentication is valid and the user has permission to control the at least one electronic.

At least some embodiments disclosed herein can be, include, or be a part of a networked system that includes mobile devices and vehicles and that is configured to implement mobile control of vehicles or in other words implement control of vehicles and vehicle systems via mobile devices. Such a system can include a vehicle that includes at least a body, a powertrain, vehicle electronics, and a computing system (such as the aforesaid vehicle). The system can also include a mobile device that includes at least a user interface and a computing system (such as the aforesaid mobile device). In some embodiments, the user interface (UI) of the mobile device can include any type of UI.

Also, drive by wire is becoming more popular in vehicles. Thus, the relation between how much the user pushes or turns versus how much the vehicle steers, accelerates, or brakes can be adjustable, customizable, and personalizable. This allows a vehicle to be reconfigured to be driven in a way more like another vehicle. Drive by wire, steer-by-wire, fly-by-wire, or x-by-wire technology include the use of electrical or electromechanical systems for performing vehicle functions traditionally achieved by mechanical linkages. This technology replaces the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders thus can be eliminated from the vehicle. Such technologies can be integrated with the systems and methods described herein.

Figure 2:
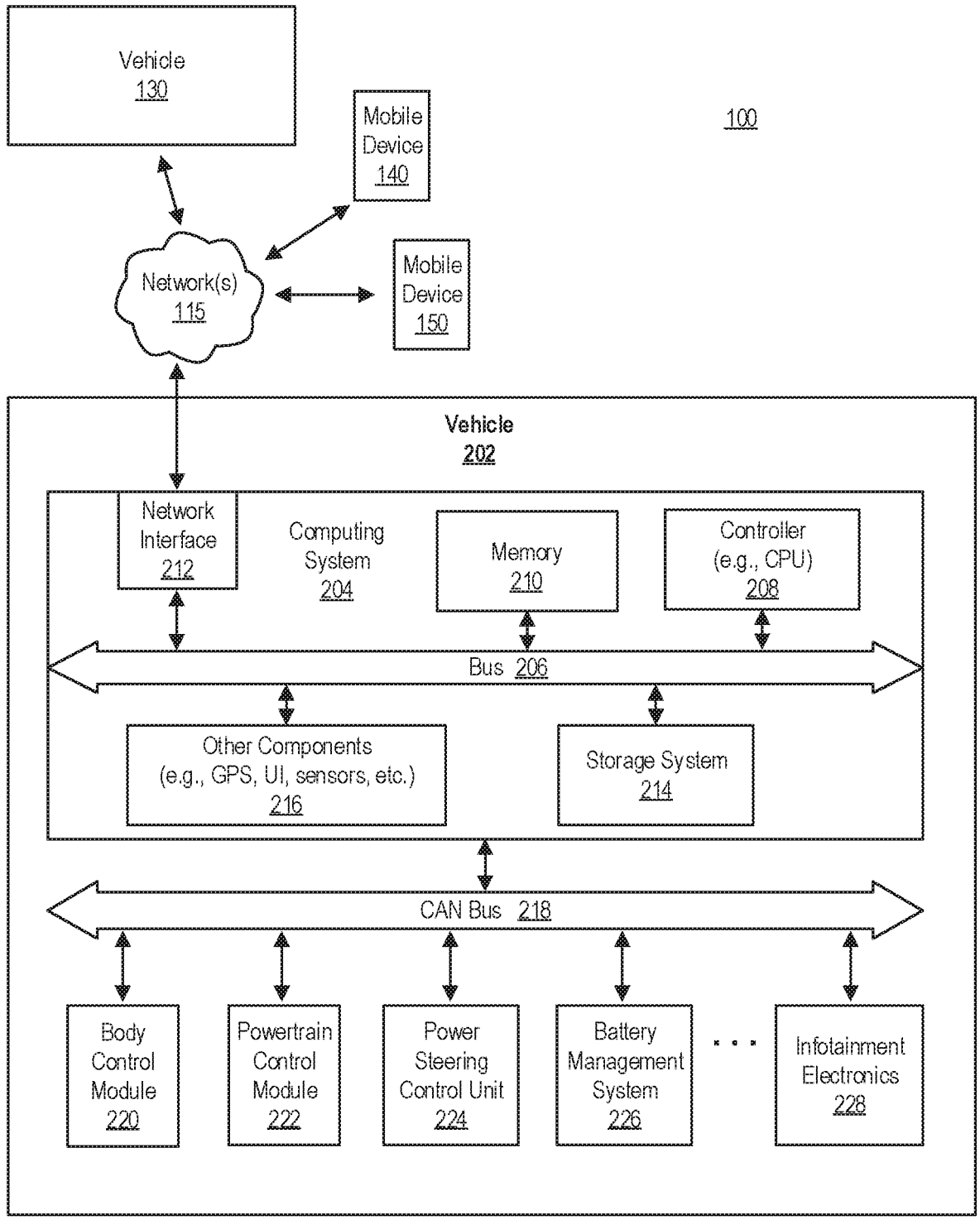
Figure 3:
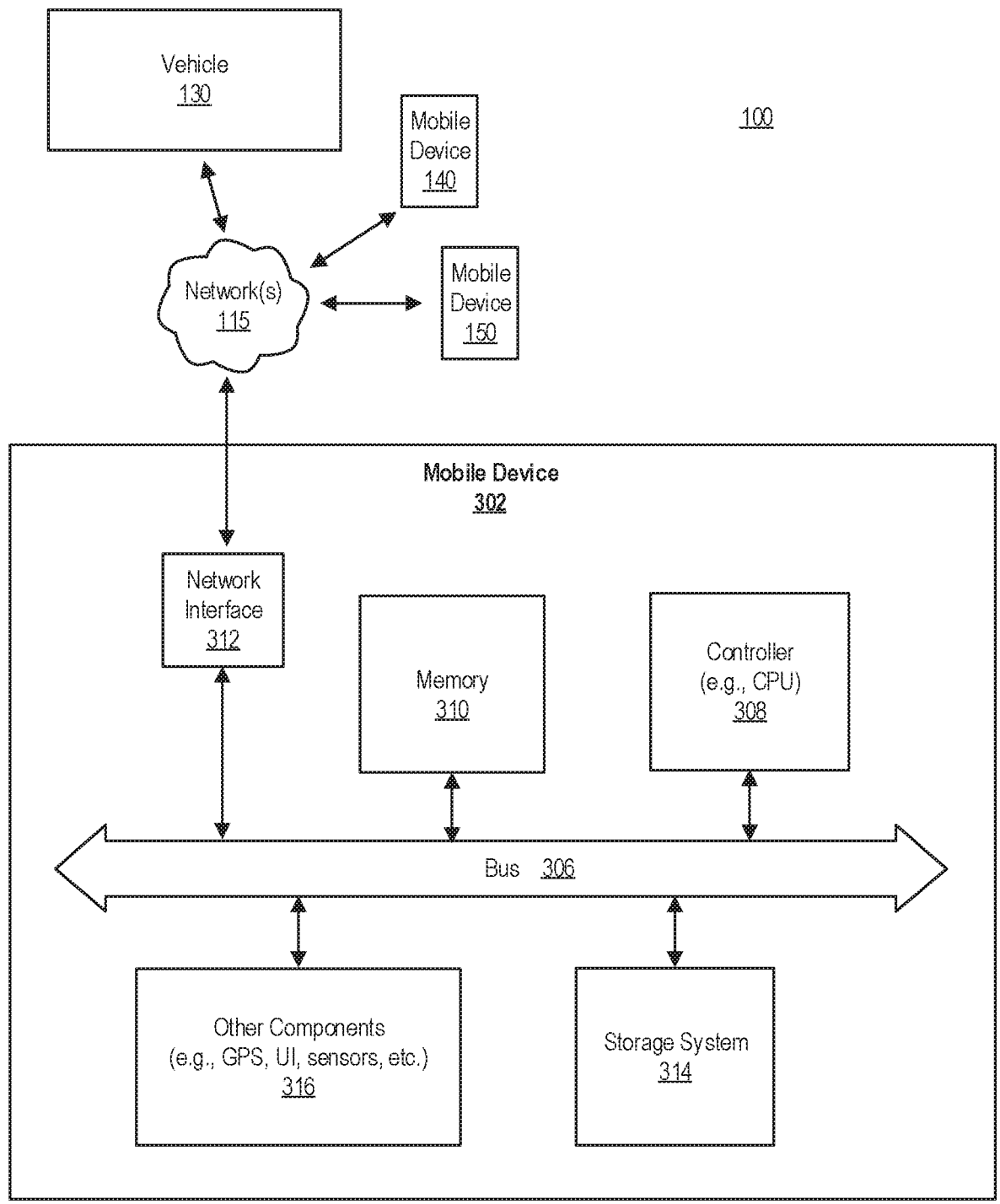

FIGS. 1 to 3 illustrate an example networked system 100 that includes at least mobile devices and vehicles (e.g., see mobile devices 140, 150, and 302 and vehicles 102, 202, and 130) and that is configured to implement mobile control of vehicles, in accordance with some embodiments of the present disclosure.

The networked system 100 is networked via one or more communications networks 115. Communication networks described herein, such as communications network(s) 115, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 150, and 302 and vehicles 102, 202, and 130) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104, a body and controllable parts of the body 106, a powertrain and controllable parts of the powertrain 108, a body control module 110, a powertrain control module 112, and a controller area network (CAN bus) 114 that connects at least the vehicle computing system, the body control module, and the powertrain control module. Also, as shown, the vehicle 102 is connected to the network(s) 115 via the vehicle computing system 104. Also, shown, vehicle 130 and mobile devices 140 and 150 are connected to the network(s) 115. And, thus, are communicatively coupled to the vehicle 102.

The vehicle 102 includes vehicle electronics, including at least electronics for the controllable parts of the body 106 and the controllable parts of the powertrain 108. As shown, the vehicle 102 includes the controllable parts of the body 106 and such parts and subsystems being connected to the body control module 110. The body includes at least a frame to support the powertrain. A chassis of the vehicle can be attached to the frame of the vehicle. The body can also include an interior for at least one driver or passenger. The interior can include seats. The controllable parts of the body 106 can also include one or more power doors and/or one or more power windows. The body can also include any other known parts of a vehicle body. And, the controllable parts of the body 106 can also include a convertible top, sunroof, power seats, and/or any other type of controllable part of a body of a vehicle. The body control module 110 can control the controllable parts of the body 106.

Also, as shown, the vehicle 102 also includes the controllable parts of the powertrain 108. The controllable parts of the powertrain 108 and its parts and subsystems are shown being connected to the powertrain control module 112. The controllable parts of the powertrain 108 can include at least an engine, transmission, drive shafts, suspension and steering systems, and powertrain electrical systems. The powertrain can also include any other known parts of a vehicle powertrain and the controllable parts of the powertrain 108 can include any other known controllable parts of a powertrain.

The computing system 104 can be configured to receive a request from a first user of a first mobile device (e.g., see mobile devices 140, 150, and 302) in the vehicle 102 to control at least one electronic of the vehicle electronics of the vehicle (e.g., see body control module 110, powertrain control module 112, and the control modules of vehicle 202). The computing system 104 can also be configured to receive a credential from the first mobile device. The computing system 104 can also be configured to verify the accuracy of the credential. The computing system 104 can also be configured to verify that the first user has permission to control the at least one electronic of the vehicle electronics. The computing system 104 can also be configured to determine whether the first user has priority over a second user of a second mobile device (e.g., see mobile devices 140, 150, and 302) for control of the at least one electronic of the vehicle electronics, when the second user is controlling the at least one electronic. And, the computing system 104 can also be configured to transfer control of the at least one electronic of the vehicle electronics from the second mobile device to the first mobile device in response to determining the first user has priority over the second user for the control of the at least one electronic and in response to successful verifications that the credential is valid and the first user has permission to control the at least one electronic.

In some embodiments, the computing system 104 can also be configured to add shared control of the at least one electronic of the vehicle electronics for the first mobile device in which the first and second mobile devices share control of the at least one electronic, in response to determining the first user has equal priority with the second user for the control of the at least one electronic and in response to successful verifications that the credential is valid and the first user has permission to control the at least one electronic.

In some embodiments, the first user has priority over the second user for control of the at least one electronic of the vehicle electronics when instructions in a memory of the computing system 104 (e.g., see memory 210 of computing system 204 of vehicle 202 depicted in FIG. 2) explicitly indicate that the first user has priority over the second user for control of the at least one electronic. In some embodiments, the first user has priority over the second user for control of the at least one electronic of the vehicle electronics when data or instructions in a memory of the computing system 104 (e.g., see memory 210 of computing system 204 of vehicle 202 depicted in FIG. 2) indicate the first user is an owner of the vehicle and the second user is not an owner of the vehicle. In some embodiments, the first user has priority over the second user for control of the at least one electronic of the vehicle electronics when the computing system 104 determines that the first user is a driver of the vehicle 102 and the second user is a passenger of the vehicle 102.

In some embodiments, the at least one electronic of the vehicle electronics can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 110 and 220, powertrain control modules 112 and 222, power steering control unit 224, battery management system 226, and infotainment electronics 228 shown in FIGS. 1 and 2 respectively). In some embodiments, the at least one electronic of the vehicle electronics can include electronics for an automated driving system.

The control of the at least one electronic of the vehicle electronics of the vehicle 102 can include control of configuration and preference information used by electronics and control modules of the vehicle 102. The configuration and preference information can pertain to adjustments of the vehicle 102 via automotive electronics (such as adjustments in the transmission, engine, chassis, passenger environment, safety features, etc. via respective automotive electronics). The configuration and preference information can also pertain to automated driving configurations and preferences. The configuration and preference information can pertain to the various levels of automation according to the SAE. Such information can pertain to no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5). Preference information can include driving mode preferences such as sports or performance mode, fuel economy mode, tow mode, all-electric mode, hybrid mode, AWD mode, FWD mode, RWD mode, 4WD mode, etc. The modes can be specific or general. For example, a user can prefer specific sports mode of a specific automaker. Or, for example, user prefers fuel economy modes in general over performance modes or sports modes. On the other hand, configuration information can include specific transmission configurations, engine configurations, chassis configurations, for the user for one or more vehicles. The configuration information can be based on the preference information. And the configuration information can adjust parts of the vehicle via respective electronics for the parts. The configuration and preference information can also pertain to in-car entertainment systems, automotive navigation systems, passenger conform systems, electronic integrated cockpit systems, etc.

In some embodiments, the computing system 104 can include a central control module (CCM), central timing module (CTM), and/or general electronic module (GEM).

Also, in some embodiments, the vehicle can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

As shown in FIG. 2, the networked system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 115 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204. The computing system 204 can be communicatively coupled to the network(s) 115 as shown. The computing system 204 includes at least a bus 206, a controller 208 (such as a CPU), memory 210, a network interface 212, a data storage system 214, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 206 communicatively couples the controller 208, the memory 210, the network interface 212, the data storage system 214 and the other components 216. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), crosspoint memory, crossbar memory, etc.), and data storage system 214, which communicate with each other via bus 206 (which can include multiple buses).

In some embodiments, the computer system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 115).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 115 via the vehicle computing system 204. Also, shown, vehicle 130 and mobile devices 140 and 150 are connected to the network(s) 115. And, thus, are communicatively coupled to the vehicle 202.

As shown, the vehicle 202 includes vehicle electronics, including at least electronics for the body and the powertrain of the vehicle as well as for other components of the vehicle. It can be inferred from FIG. 2 that the vehicle 202 includes at least the body, the body's interior (which can have seats and other interior furnishings), the powertrain, the climate control system, the infotainment system since corresponding electronics are shown as being a part of the vehicle 202. The body of the vehicle 202 includes at least a frame to support the powertrain as well as body electrical systems. A chassis of the vehicle 202 can be attached to the frame of the vehicle. The interior can provide seating for at least one driver or passenger. In other words, the interior can include one or more seats. The body can also include one or more doors and/or one or more windows. The body can also include any other known parts of a vehicle body. Also, the powertrain can include any other known parts of a vehicle powertrain.

In some embodiments, the body of the vehicle 202 can include doors and windows and an interior of the body can include seating, a dashboard, or center console, or any combination thereof. The body and the interior can also include or the vehicle 202 can also include passenger and driver comfort systems having climate control systems, or seat adjustment systems, or any combination thereof. The body and the interior can also include or the vehicle 202 can also include information and entertainment systems (or an infotainment system which is a combination of information and entertainment systems). As shown, the vehicle electronics of vehicle 202 can include electronics for the interior, the passenger and driver comfort systems, and the information and entertainment systems. And, in such embodiments, the set of components of the vehicle can include components of the interior, the passenger and driver comfort systems, or the information and entertainment systems, or any combination thereof. And, since the computing system 204 can be similar to the computing system 104, it can also be configured to control settings of such a set of components of the vehicle 202, via the vehicle electronics, according to the estimated plurality of configurations (e.g., see vehicle body control module 220 of the body, powertrain control module 222 of the powertrain, power steering control unit 224, battery management system 226, and infotainment electronics 228 of the infotainment system).

In some embodiments, the computing system 204 can include a central control module (CCM), central timing module (CTM), and/or general electronic module (GEM).

Also, in some embodiments, the vehicle 202 can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

As shown in FIG. 3, the networked system 100 can include at least a mobile device 302. The mobile device 302, which can have somewhat similar structure and/or functionality as the computing system 104 or 204, can be connected to communications network(s) 115. And, thus, be connected to vehicles 102, 202, and 130 as well as mobile devices 140 and 150.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 115 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 115 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors as well as a camera). The other components 316 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 115).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the data storage system 314, which are all components of the computing system). The computing system of the mobile device 302 can be configured send a request, inputted via a user interface (e.g., see other components 316), from a user of the mobile device 302 to a vehicle (e.g., see vehicles 102, 202, and 130) to control at least one electronic of vehicle electronics of the vehicle while the user is in the vehicle (e.g., see body control modules 110 and 220, powertrain control modules 112 and 222, power steering control unit 224, battery management system 226, and infotainment electronics 228 shown in FIGS. 1 and 2 respectively). The computing system of the mobile device 302 can also be configured to authenticate, via the user interface, the user as well as verify that the user has permission to control the at least one electronic. The computing system of the mobile device 302 can also be configured to determine whether the user has priority over a second user of a second mobile device (e.g., see mobile devices 140 and 150) for control of the at least one electronic, when the second user is controlling the at least one electronic. And, computing system of the mobile device 302 can also be configured to transfer control of the at least one electronic from the second mobile device to the mobile device in response to determining the user has priority over the second user for the control of the at least one electronic and in response to successful verifications that the authentication is valid and the first user has permission to control the at least one electronic. In some embodiments, the computing system of the mobile device 302 can also be configured to add shared control of the at least one electronic of the vehicle electronics for the mobile device in which the mobile device and the second mobile devices share control of the at least one electronic, in response to determining the user has equal priority with the second user for the control of the at least one electronic and in response to successful verifications that the authentication is valid and the user has permission to control the at least one electronic.

In some embodiments, the user has priority over the second user for control of the at least one electronic of the vehicle electronics when instructions in a memory of the computing system of the mobile device 302 (e.g., see memory 310) explicitly indicate that the user has priority over the second user for control of the at least one electronic. In some embodiments, the user has priority over the second user for control of the at least one electronic of the vehicle electronics when data or instructions in a memory of the computing system of the mobile device 302 (e.g., see memory 310) indicate the user is an owner of the vehicle and the second user is not an owner of the vehicle. In some embodiments, the user has priority over the second user for control of the at least one electronic of the vehicle electronics when the computing system of the mobile device 302 determines that the user is a driver of the vehicle and the second user is a passenger of the vehicle 102.

Figure 4:
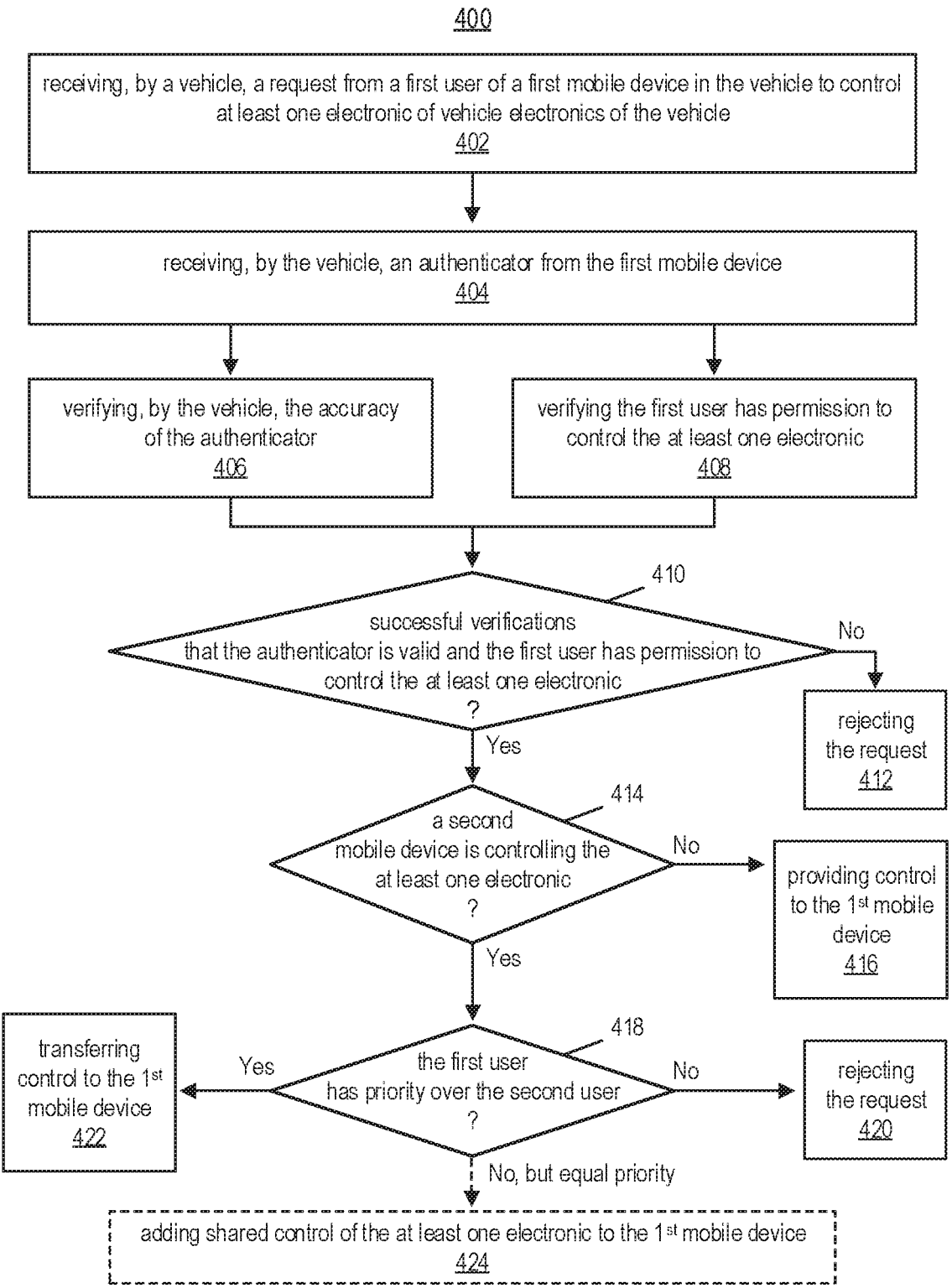
FIGS. 4 to 6 illustrate flow diagrams of example operations that can be performed by aspects of the networked system depicted in FIGS. 1 to 3, in accordance with some embodiments of the present disclosure.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle depicted in FIGS. 1 to 3.

In FIG. 4, the method 400 begins at step 402 with receiving, by a vehicle (e.g., see vehicles 102, 202, and 130 shown in FIGS. 1 to 3 respectively) a request from a first user of a first mobile device (e.g., see mobile devices 140, 150, and 302 shown in FIGS. 1 to 3 respectively) in the vehicle to control at least one electronic of vehicle electronics of the vehicle (e.g., see body control modules 110 and 220, powertrain control modules 112 and 222, power steering control unit 224, battery management system 226, and infotainment electronics 228 shown in FIGS. 1 and 2 respectively). For example, at step 402, the method 400 can begin with receiving, by a computing system of a vehicle (e.g., see computing systems 104 and 204), a request from a first user of a first mobile device in the vehicle to control at least one electronic of vehicle electronics of the vehicle. In some embodiments, the at least one electronic of the vehicle electronics can include at least one of engine electronics, transmission electronics, chassis electronics, passenger environment and comfort electronics, in-vehicle entertainment electronics, in-vehicle safety electronics, or navigation system electronics, or any combination thereof. And, in some embodiments, the at least one electronic of the vehicle electronics can include electronics for an automated driving system.

At step 404, the method 400 continues with receiving, by the vehicle, a credential from the first mobile device. For example, at step 404, the method 400 can continue with receiving, by the computing system of the vehicle, a credential from the first mobile device. At step 406, the method 400 continues with verifying, by the vehicle, the accuracy of the credential. And, a step 408, the method 400 continues with verifying the first user has permission to control the at least one electronic. For example, at steps 406 and 408, the method 400 can continue with verifying, by the computing system of the vehicle, the accuracy of the credential as well as verifying, by the computing system, that the first user has permission to control the at least one electronic.

At step 410, the method 400 continues with determining, by the vehicle (e.g., by the computing system of the vehicle), whether the verifications that the credential is valid and the first user has permission to control the at least one electronic are successful at steps 406 and 408. If one or more of the verifications at steps 406 and 408 are unsuccessful, then the method 400 continues, at step 412, with the vehicle (e.g., the computing system of the vehicle) rejecting the request received from the first user of the first mobile device. Otherwise, if the verifications at steps 406 and 408 are successful, then the method 400 continues, at step 414, with the vehicle (e.g., the computing system of the vehicle) determining whether a second user of a second mobile device (e.g., see mobile devices 140, 150, and 302) is controlling the at least one electronic. If the second user is not controlling the at least one electronic, then the method 400 continues, at step 416, with the vehicle (e.g., the computing system of the vehicle) providing control of the at least one electronic to the first mobile device. Otherwise, when the second user is controlling the at least one electronic, the method 400 continues, at step 418, with the vehicle (e.g., the computing system of the vehicle) determining whether the first user has priority over the second user for control of the at least one electronic.

Upon determining that the first user does not have priority over the second user for control of the at least one electronic, the method 400 continues, at step 420, with rejecting, by the vehicle (e.g., by the computing system of the vehicle), the request received from the first user of the first mobile device.

Upon determining that the first user has priority over the second user for control of the at least one electronic, the method 400 continues, at step 422, with transferring, by the vehicle (e.g., by the computing system of the vehicle), control of the at least one electronic from the second mobile device to the first mobile device. In other words, the control is transferred from the second user to the first user, in response to determining the first user has priority over the second user for the control of the at least one electronic and in response to successful verifications that the credential is valid and the first user has permission to control the at least one electronic, and when the second user is controlling the at least one electronic.

In some embodiments, the method 400 continues, at step 424, with adding, by the vehicle (e.g., by the computing system of the vehicle), shared control of the at least one electronic of the vehicle electronics for the first mobile device in which the first and second mobile devices share control of the at least one electronic, in response to determining the first user has equal priority with the second user for the control of the at least one electronic and in response to successful verifications that the credential is valid and the first user has permission to control the at least one electronic.

Not depicted in FIG. 4, a determination that the first user has priority over the second user for control of the at least one electronic at step 418 can occur via a memory of the vehicle (e.g., a memory of the computing system of the vehicle) explicitly indicating the first user has priority over the second user for control of the at least one electronic. Also, such a determination can occur via determining, by the vehicle (e.g., by the computing system of the vehicle), the first user is an owner of the vehicle and the second user is not an owner of the vehicle. Also, such a determination can occur via determining, by the vehicle (e.g., by the computing system of the vehicle), the first user is a driver of the vehicle and the second user is a passenger of the vehicle.

In some embodiments, it is to be understood that steps 402 to 424 can be implemented as a continuous process such as each step can run independently by monitoring input data, performing operations and outputting data to the subsequent step. Also, steps 402 to 424 can be implemented as discrete-event processes such as each step can be triggered on the events it is supposed to trigger and produce a certain output. It is to be also understood that FIG. 4 represents a minimal method within a possibly larger method of a computer system more complex than the ones presented partly in FIGS. 1 to 3. Thus, the steps depicted in FIG. 4 can be combined with other steps feeding in from and out to other steps associated with a larger method of a more complex system.

Figure 5:
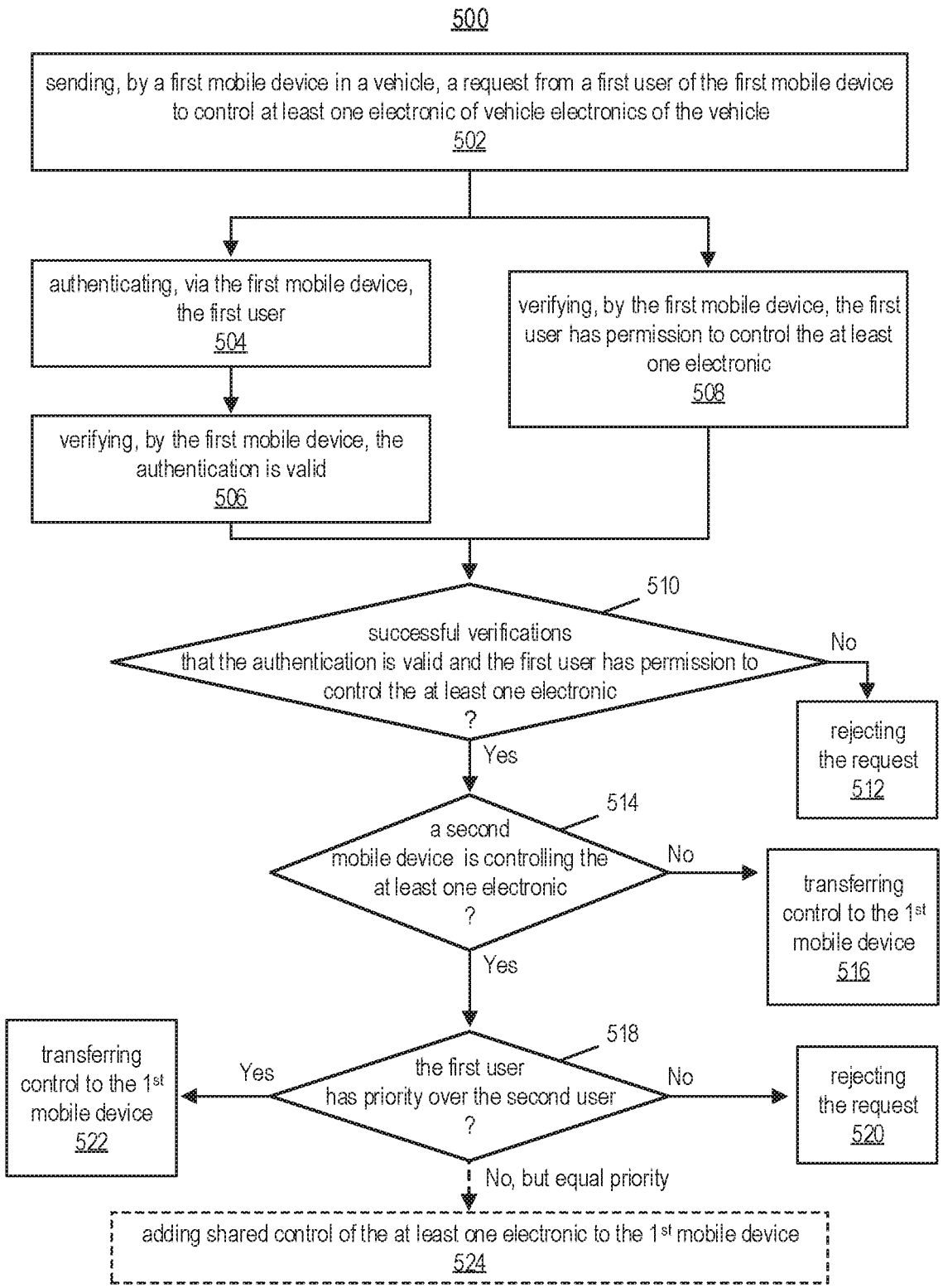

FIG. 5 illustrates a flow diagram of example operations of method 500 that can be performed by aspects of the networked system depicted in FIGS. 1 to 3, in accordance with some embodiments of the present disclosure. For example, the method 500 can be performed by any mobile device depicted in FIGS. 1 to 3. Also, the method 500 can be performed by another type of computing device such as a IoT device, smart television, smart watch, glasses or other smart household appliance, in-vehicle information system, wearable smart device, game console, PC, or digital camera, or any combination thereof.

In FIG. 5, the method 500 begins at step 502 with sending, by a first mobile device (e.g., see mobile devices 140, 150, and 302 shown in FIGS. 1 to 3 respectively) in or proximate to a vehicle (e.g., see vehicles 102, 202, and 130), a request from a first user of the first mobile to control at least one electronic of vehicle electronics of the vehicle (e.g., see body control modules 110 and 220, powertrain control modules 112 and 222, power steering control unit 224, battery management system 226, and infotainment electronics 228 shown in FIGS. 1 and 2 respectively). For example, at step 502, the method 500 can begin with sending a request, inputted via a user interface of the first mobile device (e.g., UI of other components 316 show in FIG. 3), from a user of the first mobile device to the vehicle to control the at least one electronic of vehicle electronics of the vehicle while the user is in the vehicle. In some embodiments, the at least one electronic of the vehicle electronics can include at least one of engine electronics, transmission electronics, chassis electronics, passenger environment and comfort electronics, in-vehicle entertainment electronics, in-vehicle safety electronics, or navigation system electronics, or any combination thereof. And, in some embodiments, the at least one electronic of the vehicle electronics can include electronics for an automated driving system.

At step 504, the method 500 continues with authenticating, via the first mobile device, the first user. For example, at step 504, the method 500 can continue with authenticating, via the user interface of the first mobile device, the user. At step 506, the method 500 continues with verifying, by the first mobile device, the authentication is valid. At step 508, the method 500 continues with verifying, by the first mobile device, the first user has permission to control the at least one electronic.

At step 510, the method 500 continues with determining, by the first mobile device, whether the verifications that the authentication is valid and the first user has permission to control the at least one electronic are successful at steps 506 and 508. If one or more of the verifications at steps 506 and 508 are unsuccessful, then the method 500 continues, at step 512, with the first mobile device and/or the vehicle (e.g., the computing system of the vehicle) rejecting the request sent by the first user of the first mobile device. Otherwise, if the verifications at steps 506 and 508 are successful, then the method 500 continues, at step 514, with the first mobile device and/or the vehicle determining whether a second user of a second mobile device (e.g., see mobile devices 140, 150, and 302) is controlling the at least one electronic. If the second user is not controlling the at least one electronic, then the method 500 continues, at step 516, with the first mobile device and/or the vehicle providing control of the at least one electronic to the first mobile device. Otherwise, when the second user is controlling the at least one electronic, the method 500 continues, at step 518, with the first mobile device and/or the vehicle determining whether the first user has priority over the second user for control of the at least one electronic.

Upon determining that the first user does not have priority over the second user for control of the at least one electronic, the method 500 continues, at step 520, with rejecting, by the first mobile device and/or the vehicle, the request sent by the first user of the first mobile device.

Upon determining that the first user has priority over the second user for control of the at least one electronic, the method 500 continues, at step 522, with transferring, by the first mobile device and/or the vehicle, control of the at least one electronic from the second mobile device to the first mobile device. In other words, the control is transferred from the second user to the first user, in response to determining the first user has priority over the second user for the control of the at least one electronic and in response to successful verifications that the credential is valid and the first user has permission to control the at least one electronic, and when the second user is controlling the at least one electronic.

In some embodiments, the method 500 continues, at step 524, with adding, by the first mobile device and/or the vehicle, shared control of the at least one electronic of the vehicle electronics for the first mobile device in which the first and second mobile devices share control of the at least one electronic, in response to determining the first user has equal priority with the second user for the control of the at least one electronic and in response to successful verifications that the credential is valid and the first user has permission to control the at least one electronic.

Not depicted in FIG. 5, a determination that the first user has priority over the second user for control of the at least one electronic at step 518 can occur via a memory of the first mobile device (e.g., see memory 310) and/or a memory of the vehicle (e.g., a memory of the computing system of the vehicle) explicitly indicating the first user has priority over the second user for control of the at least one electronic. Also, such a determination can occur via determining, by the first mobile device and/or the vehicle, the first user is an owner of the vehicle and the second user is not an owner of the vehicle. Also, such a determination can occur via determining, by the first mobile device and/or the vehicle, the first user is a driver of the vehicle and the second user is a passenger of the vehicle.

In some embodiments, it is to be understood that steps 502 to 524 can be implemented as a continuous process such as each step can run independently by monitoring input data, performing operations and outputting data to the subsequent step. Also, steps 502 to 524 can be implemented as discrete-event processes such as each step can be triggered on the events it is supposed to trigger and produce a certain output. It is to be also understood that FIG. 5 represents a minimal method within a possibly larger method of a computer system more complex than the ones presented partly in FIGS. 1 to 3. Thus, the steps depicted in FIG. 5 can be combined with other steps feeding in from and out to other steps associated with a larger method of a more complex system.

Figure 6:
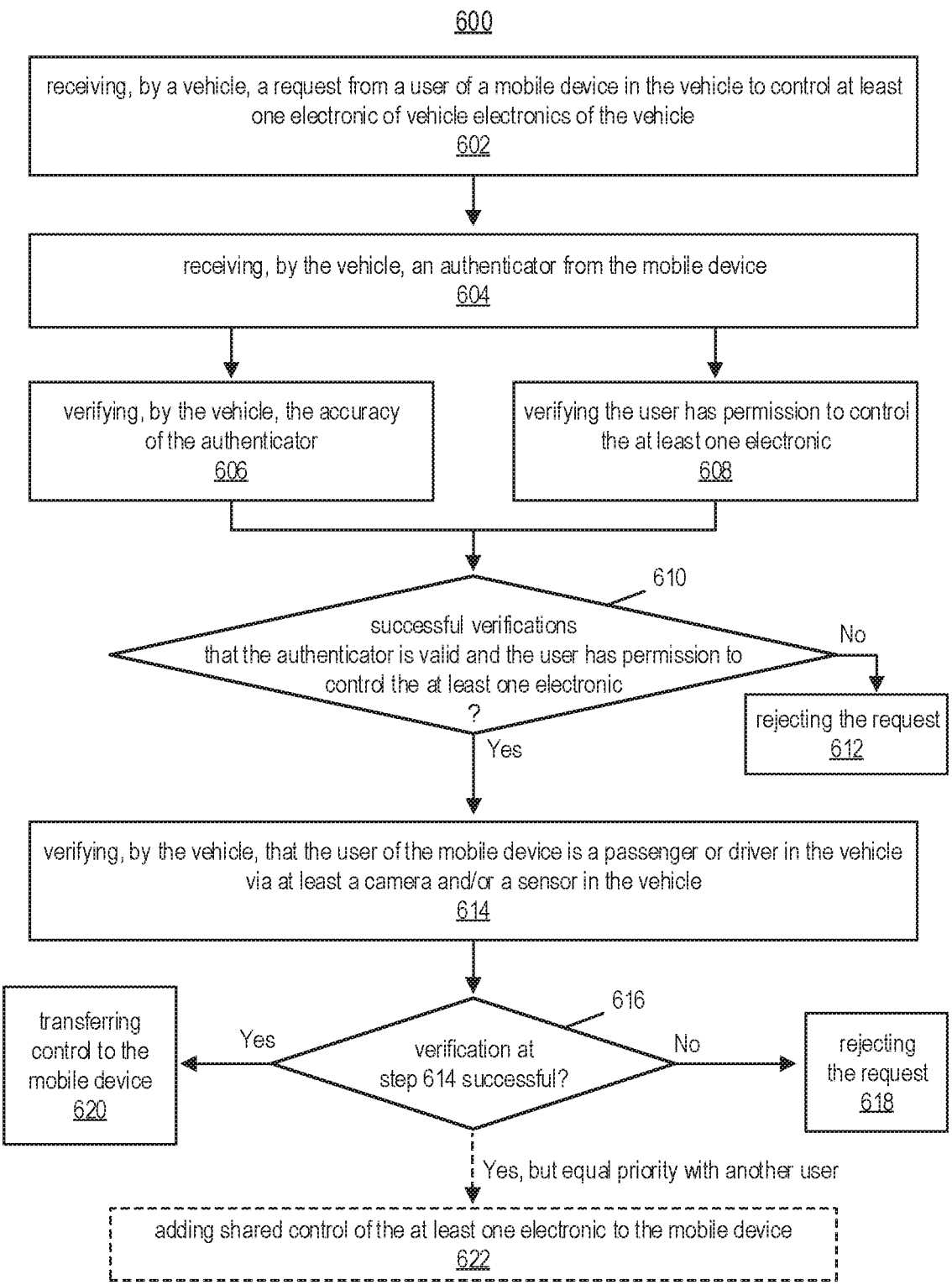

FIG. 6 illustrates a flow diagram of example operations of method 600 that can be performed by aspects of the networked system depicted in FIGS. 1 to 3, in accordance with some embodiments of the present disclosure. For example, the method 600 can be performed by any vehicle depicted in FIGS. 1 to 3 or more specifically, by a computing system and/or other parts of any vehicle depicted in FIGS. 1 to 3.

In FIG. 6, the method 600 begins at step 602 with receiving, by a vehicle (such as by a computing system of the vehicle), a request from a user of a mobile device, in the vehicle, to control at least one electronic of vehicle electronics of the vehicle. At step 604, the method 600 continues with receiving, by the vehicle, a credential from the user of the mobile device. At step 606, the method 600 continues with verifying, by the vehicle, the accuracy of the credential. At step 608, the method 600 continues with verifying, by the vehicle, the user has permission to control the at least one electronic.

At step 610, the method 600 continues with determining, by the vehicle, whether the verifications that the credential is valid and the user has permission to control the at least one electronic were successful. If one or more of the verifications at steps 606 and 608 were not successful, then the method 600 continues, at step 612, with rejecting, by the vehicle, the request from the user. Otherwise, if the verifications at steps 606 and 608 were successful, then the method 600 continues, at step 614, with verifying, by the vehicle, that the user of the mobile device is a passenger or driver in the vehicle via at least a camera and/or a sensor in the vehicle.

At step 616, the method continues with determining whether the verification at step 614 was successful (a successful determination is a determination that the user is a passenger or a driver of the vehicle). If the verifications at step 614 is not successful, then the method 600 continues, at step 618, with rejecting, by the vehicle, the request from the user. Otherwise, if the verification at step 614 was successful, then the method 600 continues, at step 620, with the vehicle transferring control of the at least one electronic to the mobile device according to the request.

Also, in some embodiments, when another user of another mobile device is controlling the at least one electronic, the vehicle can determine whether the user of the mobile device has priority over the other user of the other mobile device for control of the at least one electronic. And, in response to determining the user has priority over the other user for the control of the at least one electronic, the vehicle can provide the mobile device control of the at least one electronic over the other mobile device (e.g., see step 620). And, in response to determining the user has equal priority with the other user for the control of the at least one electronic, the vehicle can provide the mobile device with shared control of the at least one electronic with the other mobile device.

In some embodiments, it is to be understood that steps 602 to 622 can be implemented as a continuous process such as each step can run independently by monitoring input data, performing operations and outputting data to the subsequent step. Also, steps 602 to 622 can be implemented as discrete-event processes such as each step can be triggered on the events it is supposed to trigger and produce a certain output. It is to be also understood that FIG. 6 represents a minimal method within a possibly larger method of a computer system more complex than the ones presented partly in FIGS. 1 to 3. Thus, the steps depicted in FIG. 6 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one processing device; and
   memory containing instructions configured to instruct the at least one processing device to:
      store data indicating that a first user has previously been a driver of a vehicle and a second user has not been a driver of the vehicle;
      provide, by a control interface of the vehicle, control of at least one electronic device, wherein the at least one electronic device controls a brake of the vehicle;
      receive a request from a first mobile device of a first user located in the vehicle to control the at least one electronic device;
      in response to receiving the request, authenticate the first mobile device;
      verify, using at least one of a camera or sensor of the vehicle, that the first user is a passenger in the vehicle;
      in response to authenticating the first mobile device and verifying that the first user is a passenger in the vehicle, extend control of the at least one electronic device to the first mobile device;
      determine, based on the stored data, whether the first user has priority over a second user of a second mobile device for control of the at least one electronic device; and
      in response to determining the first user has priority over the second user, transfer control of the at least one electronic device from the second mobile device to the first mobile device.

2. The system of claim 1, wherein the instructions are further configured to instruct the at least one processing device to verify that the first user has permission to control the at least one electronic device.

3. The system of claim 1, wherein the first user is able to control braking of the vehicle via a user interface of the first mobile device.

4. The system of claim 1, wherein the instructions are further configured to instruct the at least one processing device to determine that the request is received in a communication from the first mobile device, and further determine that the communication is sent by the first mobile device using a local wired or wireless connection with the vehicle.

5. The system of claim 1, wherein the instructions are further configured to instruct the at least one processing device to determine that the first user has priority over the second user for control of the at least one electronic device based on determining that the first user has been a driver of the vehicle, and further based on determining that the second user is a passenger of the vehicle when the request from the first mobile device is received.

6. The system of claim 1, wherein the at least one electronic device controls navigation of the vehicle.

7. The system of claim 1, wherein the at least one electronic device comprises an electronic device for controlling a level of driving automation of the vehicle.

8. The system of claim 1, wherein the instructions are further configured to instruct the at least one processing device to:
determine whether the first user has priority over a first driver for control of the at least one electronic device;
wherein the extending control to the first mobile device is further in response to determining that the first user has priority over the first driver for control of the at least one electronic device.

9. The system of claim 1, wherein the instructions are further configured to instruct the at least one processing device to:
verify that the first mobile device is authorized to control the at least one electronic device; and
verify that the first mobile device is located in the vehicle;
wherein the extending control is further in response to verifying that the first mobile device is authorized to control the at least one electronic device, and that the first mobile device is located in the vehicle.

10. A method comprising:
receiving, from a first mobile device of a first user, a first request for control of at least one electronic device of a vehicle, wherein the first request is included in a wireless communication from the first mobile device, and wherein the vehicle provides a control interface to a driver of the vehicle for controlling the at least one electronic device;
in response to receiving the first request, verifying that the first mobile device is authorized to control the at least one electronic device;
determining whether the first user has priority over the driver for control of the at least one electronic device;
verifying that the first user is located in the vehicle;
in response to verifying that the first mobile device is authorized to control the at least one electronic device, determining that the first user has priority over the driver, and verifying that the first user is located in the vehicle, transferring control of the at least one electronic device from the driver to the first mobile device;
receiving a second request for control from a second user;
in response to receiving the second request, determining a status of priority for the first user relative to the second user for control of the at least one electronic device, wherein determining the status results in selection from available outcomes that include transferring control to the second user, adding shared control, and rejecting the second request;
selecting, based on the determined status, the outcome of adding shared control, wherein the determined status is that the first user has equal priority with the second user; and
in response to selecting the outcome of adding shared control, providing shared control of the at least one electronic device to the first mobile device and a second mobile device of the second user.

11. The method of claim 10, wherein the transferring control from the driver to the first mobile device comprises displaying at least a portion of the control interface in a user interface of the first mobile device.

12. The method of claim 10, wherein the verifying that the first user is located in the vehicle is performed using at least one of a camera of the first mobile device, a sensor of the first mobile device, a camera of the vehicle, or a sensor of the vehicle.

13. A system comprising:
at least one processing device; and
memory containing instructions configured to instruct the at least one processing device to:
store data indicating that a second user has previously been a driver of a vehicle and a first user has not been a driver of the vehicle;
provide, by a control interface of the vehicle to the first user, control of at least one electronic device of the vehicle, wherein the at least one electronic device controls a brake of the vehicle;
receive, from a mobile device of the second user, a communication including a request to control the at least one electronic device;
in response to receiving the communication, verify that the mobile device is authorized to control the at least one electronic device;
determine, based on the stored data, whether the second user has priority over the first user for control of the at least one electronic device; and
in response to verifying that the mobile device is authorized to control the at least one electronic device, verifying that the second user is located in the vehicle as indicated by a camera or sensor, and determining the second user has priority over the first user, extend control of the at least one electronic device to the mobile device, wherein the second user is able to control braking of the vehicle via the mobile device.

14. The system of claim 13, wherein the instructions are further configured to instruct the at least one processing device to verify, using at least one of the camera or the sensor of the vehicle, that the mobile device is located in the vehicle.

* * * * *